(12) United States Patent
Sisk

(10) Patent No.: US 6,957,944 B2
(45) Date of Patent: Oct. 25, 2005

(54) METHOD AND APPARATUS FOR STACKING SMALL SHEETS OF GLASS

(75) Inventor: Mark Sisk, Hampton, GA (US)

(73) Assignee: Cardinal FG Company, Eden Prairie, MN (US)

( * ) Notice: Subject to any disclaimer, the term of this patent is extended or adjusted under 35 U.S.C. 154(b) by 0 days.

(21) Appl. No.: 10/179,681

(22) Filed: Jun. 25, 2002

(65) Prior Publication Data

US 2002/0180142 A1   Dec. 5, 2002

(51) Int. Cl.$^7$ .................................... B65G 57/00
(52) U.S. Cl. .................. 414/798.6; 414/798.5; 414/798.9
(58) Field of Search ................ 414/798.2, 798.5, 414/798.6, 798.7, 798.8, 798.9

(56) References Cited

U.S. PATENT DOCUMENTS

| | | | | |
|---|---|---|---|---|
| 3,662,875 A | * | 5/1972 | Salomon ................. | 198/419.3 |
| 3,682,329 A | * | 8/1972 | Dean ....................... | 414/798.5 |
| 3,713,650 A | * | 1/1973 | Hodgkinson et al. .... | 414/798.5 |
| 4,093,083 A | | 6/1978 | Klaus | |
| 4,320,826 A | | 3/1982 | Kramer et al. ............ | 198/425 |
| 4,750,854 A | * | 6/1988 | Pascale et al. ........... | 414/798.5 |
| 4,925,173 A | | 5/1990 | Lindblom et al. ........ | 270/54 |
| 5,030,059 A | | 7/1991 | Favre | |
| 5,044,876 A | * | 9/1991 | Stohlquist ................. | 414/798.2 |
| 5,209,627 A | | 5/1993 | Lisec ....................... | 414/398 |
| 5,522,588 A | * | 6/1996 | Soltysiak ................. | 270/58.07 |
| 5,595,280 A | * | 1/1997 | Spatafora ................. | 198/429 |
| 6,832,886 B2 | * | 12/2004 | Michler et al. .......... | 414/790.8 |

FOREIGN PATENT DOCUMENTS

| | | | |
|---|---|---|---|
| DE | 2547298 A1 | * | 5/1977 |
| EP | 0012081 | * | 6/1980 |
| EP | 0 301 205 | | 7/1987 |
| EP | 0 344 716 | | 6/1989 |
| GB | 1340044 | | 2/1970 |
| WO | WO 92/04265 | | 3/1992 |

* cited by examiner

*Primary Examiner*—Douglas Hess
(74) *Attorney, Agent, or Firm*—Fredrikson & Byron, PA

(57) ABSTRACT

A method and apparatus for stacking small sheets of glass or other material, wherein manual stacking is eliminated and robotic/machine cycle times are significantly reduced, and wherein such an apparatus enables the stacking of small sheets of glass or other material/lites in single and/or multiple rows and/or tiers.

17 Claims, 8 Drawing Sheets

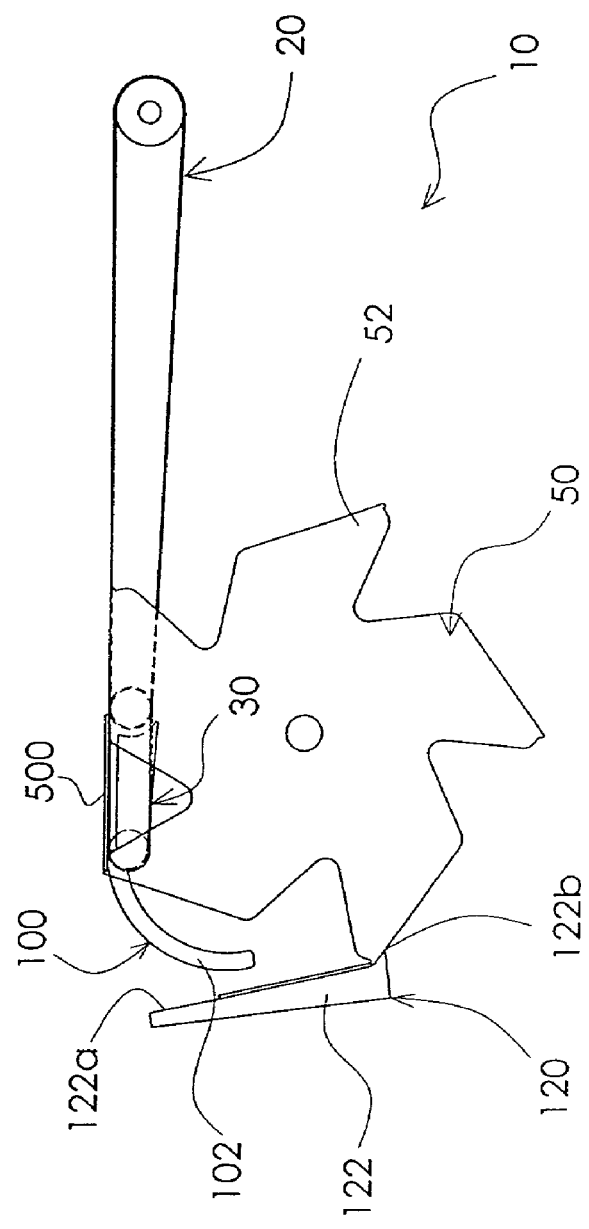

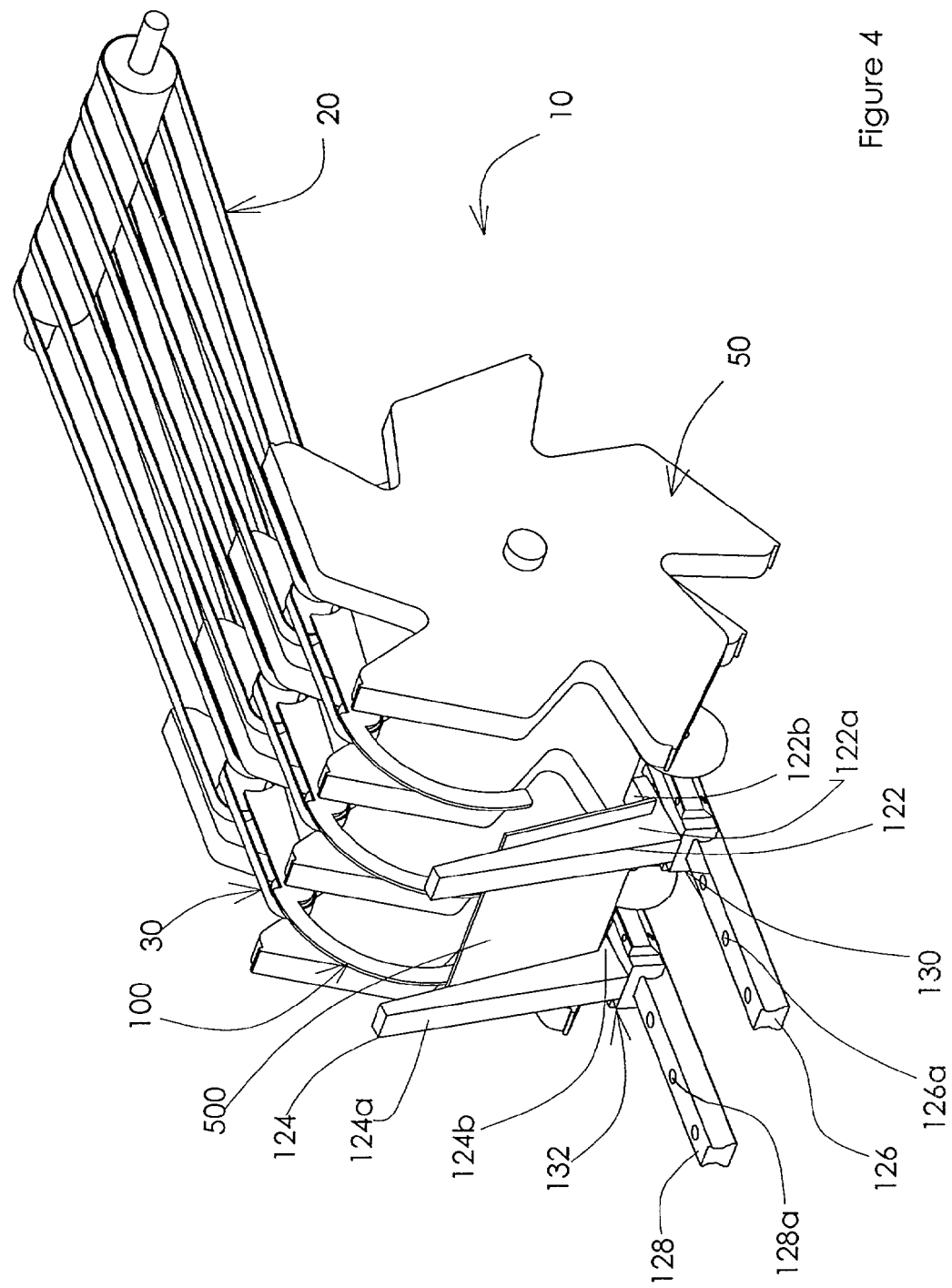

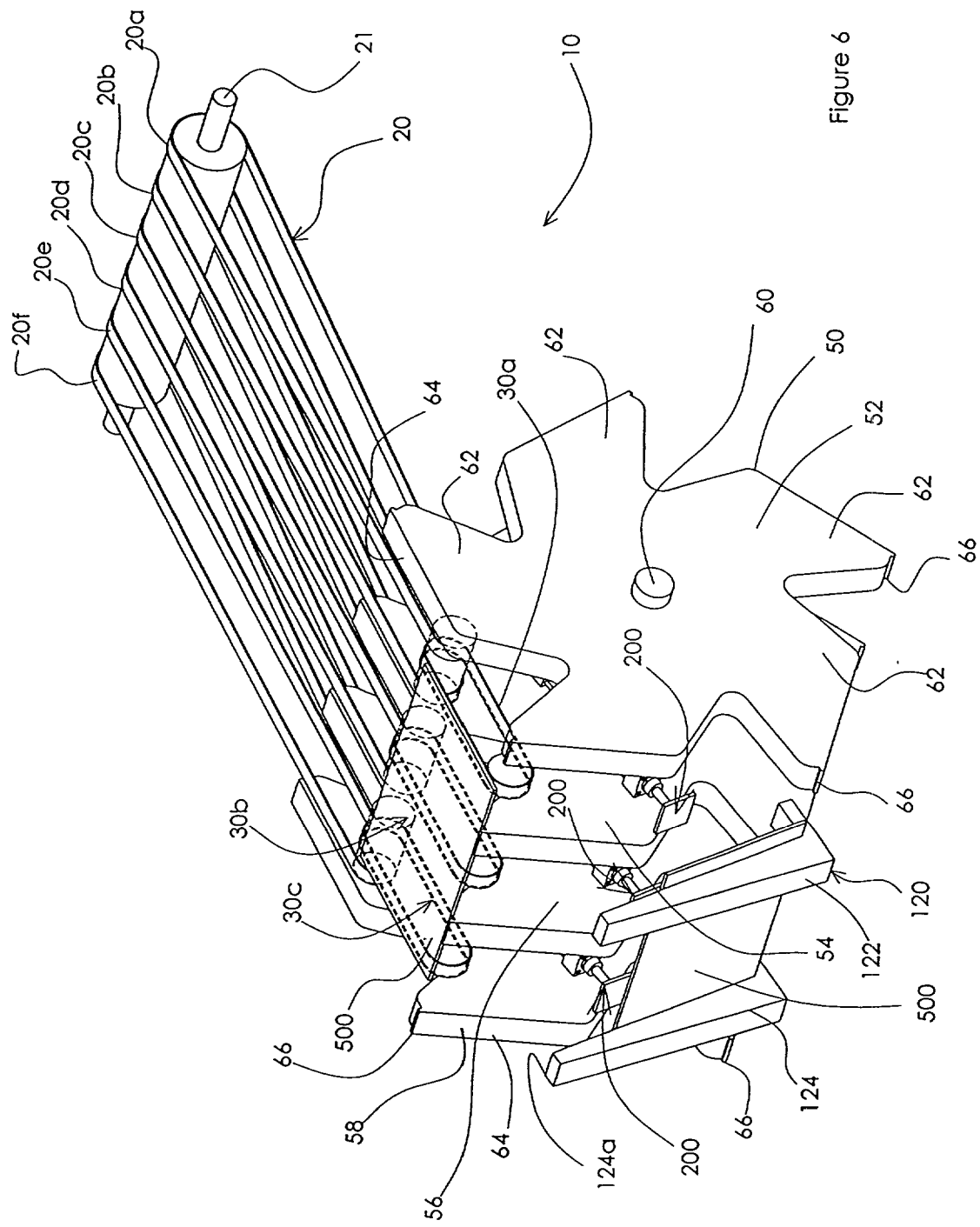

METHOD AND APPARATUS FOR STACKING SMALL SHEETS OF GLASS

TECHNICAL FIELD

The present invention relates generally to stacking machines, and more specifically to a method and apparatus for stacking small sheets of glass. The present invention is particularly suitable for, although not strictly limited to, the automated mechanical stacking of small sheets of glass within a mass production environment.

BACKGROUND OF THE INVENTION

Stacking small sheets of glass, or lites as they are termed within the industry, is presently largely dependent on manual labor and/or antiquated machinery having limited flexibility in the manner in which the lites are handled and stacked. Either method, unfortunately, has a tendency to yield highly inefficient and protracted stacking processes.

Specifically, operators/laborers of glass manufacturing machinery are burdened with having to manually remove individual lites from a feed conveyor, stack each of the lites on transportation racks and thereafter continuously repeat this same step in what essentially amounts to a highly labor-intensive cyclic process. The inherent disadvantage of such a manual process is that cycle times are typically between two to three seconds per cycle, resulting in cycle inefficiencies and thus, high operational costs.

Although attempts at reducing manual stacking of lites have been made via implementation of robotic technology, typical cycle time for such robotic machinery is between eight and ten seconds per cycle, thus resulting in operational inefficiencies and further requiring additional machinery to maintain cycle and stacking demands.

Additionally, machinery specifically designed for glass stacking purposes is disadvantageously limited in the manner in which the lites must be stacked. Specifically, such machinery is usually restricted to picking up glass sheets from the top or bottom of the sheet as the sheets leave the conveyor belt, thus prohibiting the machine from stacking the lites in multiple rows and/or tiers and leading to inherently longer cycle times.

Therefore, it is readily apparent that there is a need for a method and apparatus for stacking small sheets of glass or the like, wherein manual stacking is eliminated and robotic/machine cycle times are significantly reduced, and wherein such an apparatus enables the stacking of small sheets of glass/lites or the like in single and/or multiple rows and/or tiers.

BRIEF SUMMARY OF THE INVENTION

Briefly described, in a preferred embodiment, the present invention overcomes the above-mentioned disadvantages and meets the recognized need for such a device by providing a method and apparatus for stacking small sheets of glass or the like, wherein manual stacking is eliminated and robotic/machine cycle times are significantly reduced, and wherein such an apparatus enables the stacking of small sheets of glass/lites or the like in single and/or multiple rows and/or tiers.

According to its major aspects and broadly stated, the present invention in its preferred form is a method and apparatus for stacking small sheets of glass having in one embodiment a belt conveyor, a cam mechanism, a supportive rotating element, an indexing slide, a robotic arm and transportation racks.

More specifically, the present invention is a method and apparatus for stacking small sheets of glass having a belt conveyor leading off a principle conveyor from were the lites originate, wherein the lites travel over the belt conveyor and thereafter are brought into supportive communication with a supportive rotating element and a downwardly sloped/curved cam mechanism. As the rotating element rotates, the lites are lifted and advanced forward via frictional edges on the rotating element, thus enabling the lites to slide onto sub-belt conveyors that lead off from the belt conveyor, and onto the cam mechanism, wherein the sub-belt conveyors and the communicating cam mechanism preferably downwardly pivot to assist in the full clearance of the lites past/over the cam mechanism and into the indexing slide. To assist in bringing the lites from a horizontal position from off the sub-belt conveyors and communicating cam mechanism to a vertical position into the indexing slide, the sub-belt conveyors and communicating cam mechanism preferably return to their original position by upwardly pivoting, and thereby simultaneously gently push/kick the trailing edge of the lite, thus pushing the lite into a substantially vertical position within the indexing slide. To prevent the lites from falling freely off the rotating element during rotation of the rotating element, the leading edge of each of the lites is supported/carried on a lip formed at the edge of the rotating element, wherein further support could also be provided via vacuum mechanisms positioned proximal the rotating element and slide supports.

After receipt of a lite, the indexing slide preferably indexes or shifts back to yield a sufficient depth for receipt therein of the next lite conveyed thereto via the rotating element, sub-belt conveyors and communicating cam mechanism. When the indexing slide has accumulated a pre-programmed/desired stack of lites, a robotic arm engages and picks up the stacked lites in any orientation and places the stacked lites on a transportation rack, turntable, shuttle or the like. The process is continuous and may be halted and/or speed-controlled as desired. In one embodiment, the apparatus further possesses a means for inspection and/or removal of damaged and/or defective lites.

A feature and advantage of the present invention is its ability to stack small sheets of glass/lites at high cycle times, typically on the order of one to two seconds per lite, depending upon the size of lites being stacked.

A feature and advantage of the present invention is its ability to stack lites in single and/or multiple rows and/or tiers.

A feature and advantage of the present invention is its ability to allow a robotic arm/mechanism to grasp and pick up a stack of lites in any orientation, including but not limited to, front, rear, side, portrait and/or landscape orientations, and to stack the lites in single and/or multiple rows and/or tiers.

A feature and advantage of the present invention is its ability to be adapted, altered and/or modified to allow the stacking of any size, width, thickness and/or number of glass sheets/lites.

A feature and advantage of the present invention is its ability to be adapted, altered and/or modified to allow the stacking of any type of sheet of material, such as, for exemplary purposes only, wood sheets, plastic sheets and/or metal sheets.

A feature and advantage of the present invention is its ability to discard damaged and/or defective lites without reducing desired cycle times.

A feature and advantage of the present invention is its incorporation of an indexing slide to assist in the stacking of lites therein.

A feature and advantage of the present invention is its simplicity of design.

A feature and advantage of the present invention is its ability to incorporate multiple conveyors, rotating elements and indexing slides for multiple stacking processes.

These and other objects, features and advantages of the present invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structures and refer to like elements throughout, and in which:

FIG. 3A is a perspective view of an apparatus for stacking small sheets of glass according to a preferred embodiment of the present invention showing a glass sheet/lite in the process of being stacked.

FIG. 4 is a perspective view of an apparatus for stacking small sheets of glass according to a preferred embodiment of the present invention.

FIG. 6 is a perspective view of an apparatus for stacking small sheets of glass according to an alternate embodiment of the present invention.

DETAILED DESCRIPTION OF THE PREFERRED AND ALTERNATIVE EMBODIMENTS

Figure 1:
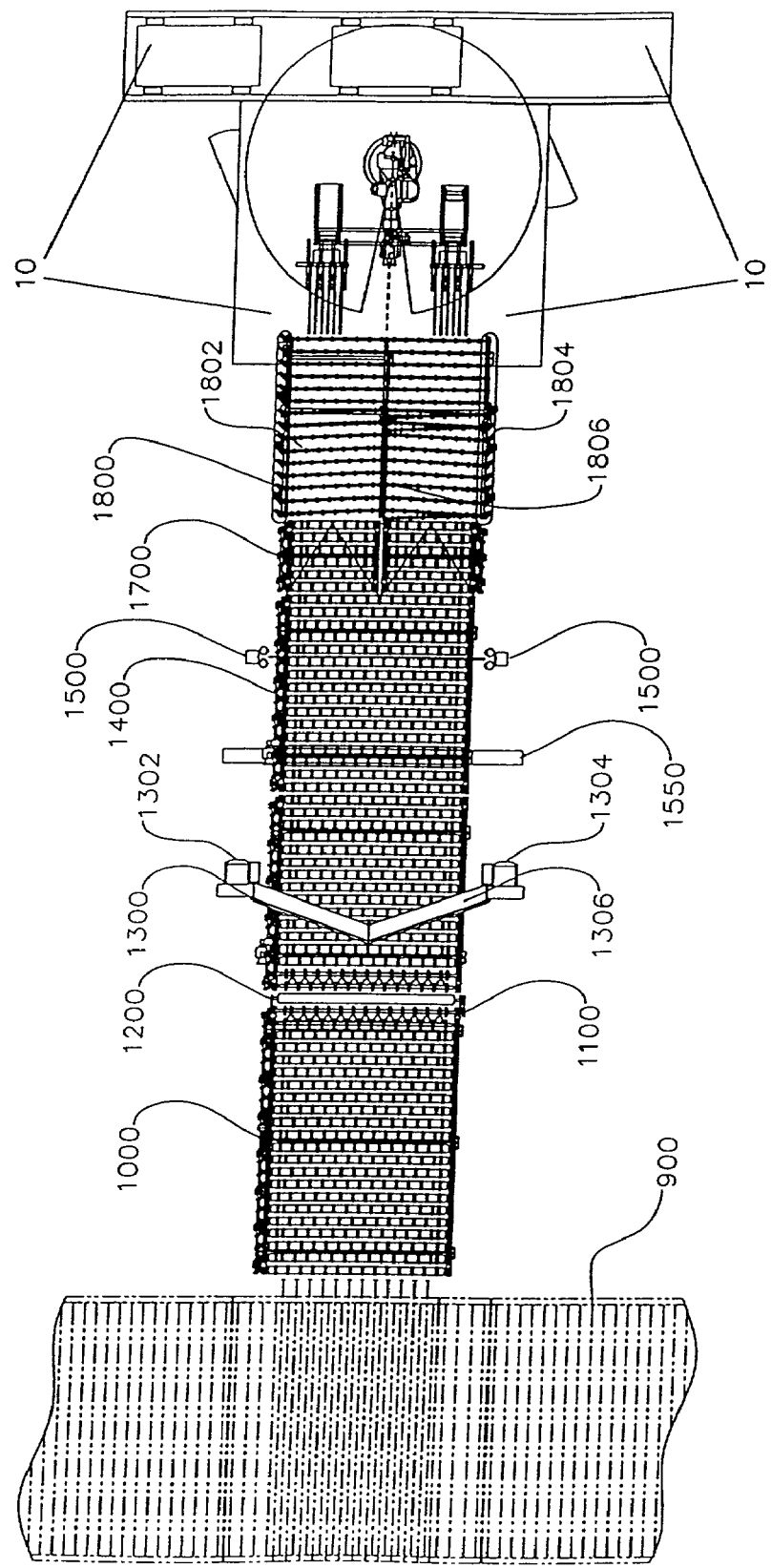
FIG. 1 is a top view of a conveyor assembly and an apparatus for stacking small sheets of glass according to a preferred embodiment of the present invention and in a double stream mode.

In describing the preferred and selective alternate embodiments of the present invention, as illustrated in FIGS. 1–6, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 2–5, the present invention in a preferred embodiment is a stacking apparatus 10 having belt conveyor assembly 20, sub-belt conveyor assembly 30, supportive rotating element 50, cam mechanism 100, indexing slide 120, robotic arm 150 and transportation unit 160.

Referring now to FIG. 1, a brief overview of the preferred method of production of lites in a double stream mode will be presented. Specifically, known float glass processes generate an endless ribbon of glass, wherein the glass ribbon is conveyed over mainline 900 and preferably scored in the cross machine direction for subsequent formation of caps, and further scored in the machine direction for subsequent formation of lites via conventional scoring processes as known within the art. After being scored on mainline 900, the glass ribbon is preferably snapped via known glass-snapping mechanisms along the cross machine direction scores to produce caps, wherein the snapping of the glass ribbon to produce the caps is preferably implemented on mainline 900. The produced caps are preferably subsequently presented onto roller conveyor 1000 for introduction into snap roll assembly 1100 for formation of lites, as more fully described below. Roller conveyor 1000 is preferably positioned perpendicular to mainline 900; however, other suitable arrangements may be utilized as known within the art. Roller conveyor 1000 may possess any suitable dimension and speed in accord with industry standards and desires. Roller conveyor 1000 and snap roll assembly 1100 are preferably rotatable via conventional drive shafts, timing belts and motors as known within the art.

Figure 2:
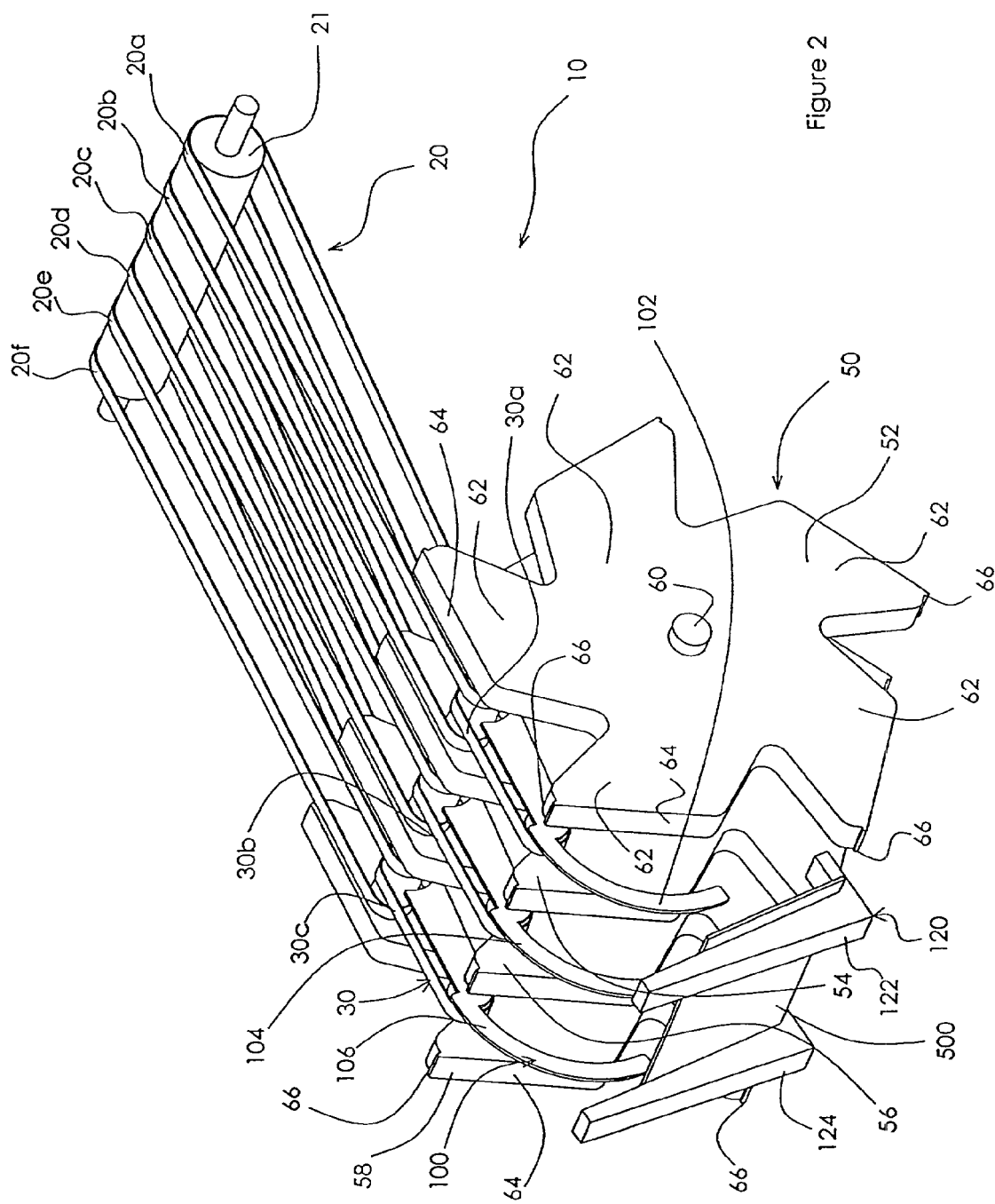
FIG. 2 is a perspective view of an apparatus for stacking small sheets of glass according to a preferred embodiment of the present invention.

Roller conveyor 1000 preferably conveys the caps to snap roll assembly 1100, wherein the caps are preferably received and subsequently snapped therein via known glass snapping mechanisms along the machine direction scores to produce lites (as shown in FIG. 2). Lites 500 may possess any suitable dimension in accord with industry standards and desires. Hold down assembly 1200 preferably assists in preventing the scored caps from lifting up during the snapping process to produce lites 500.

Following the production of lites 500, lites 500 are introduced into chip blower assembly 1300, wherein chip blower assembly 1300 preferably functions to clean/remove glass chips/fragments from the surface of lites 500 after the snapping process. Chip blower assembly 1300 preferably possesses two blowers 1302 and 1304 wherein blowers 1302 and 1304 are preferably opposingly mounted on the sides of V-shaped tube 1306, and wherein V-shaped tube 1306 is preferably frontally formed as an air knife to channel air generated by blowers 1302 and 1304 therepast and onto lites 500. Chip blower assembly 1300 is further preferably positioned over acceleration conveyor 1400, as more fully described below.

While lites 500 are being subjected to chip blower assembly 1300, they are preferably simultaneously being conveyed over acceleration conveyor 1400, wherein acceleration conveyor 1400 preferably functions to accelerate lites 500 and thus create gaps between each lite 500 for facilitation of the stacking process of lites 500. Acceleration conveyor 1400 may possess any suitable dimension and speed in accord with industry standards and desires. Acceleration conveyor 1400 is preferably rotatable via conventional drive shafts, timing belts and motors as known within the art.

Once past acceleration conveyor 1400, lites 500 are thereafter preferably introduced into inspection conveyor 1500, wherein inspection conveyor 1500 preferably serves to permit inspection of lites 500 via inspection camera 1550 for removal of damaged and/or defective lites 500 therefrom. Inspection conveyor 1500 may possess any suitable dimension and speed in accord with industry standards and desires. Inspection conveyor 1500 is preferably rotatable via conventional drive shafts, timing belts and motors as known within the art.

Preferably positioned behind inspection camera 1550 and spanning over inspection conveyor 1500 is powder applicator 1600, wherein powder applicator 1600 preferably distributes and applies powder over lites 500 so as to prevent frictional/suctioned contact between lites 500 when stacked via stacking apparatus 10, as more fully described below.

Following application of powder from powder applicator 1600, lites 500 are subject to double tipple assembly 1700, wherein double tipple assembly 1700 preferably permits the rejection of damaged/defective lites 500 in the double stream mode. The rejected lites 500 are thereafter preferably subject to a crusher via an infeed conveyor as known within the art. Double tipple assembly 1700 may possess any suitable dimension and speed in accord with industry standards and desires. Double tipple assembly 1700 is preferably rotatable via conventional drive shafts, timing belts and motors as known within the art.

Upon leaving double tipple assembly 1700, lites 500 are introduced onto alignment conveyor 1800, wherein alignment conveyor 1800 preferably functions to align the outer edge of each lite 500. The first half of alignment conveyor 1800 is preferably designed as a chevron conveyor, thus allowing lites 500 to be pushed to outer tank tracks 1802 and 1804, wherein a bar 1806 preferably further assists in the separation of lites 500 into two streams of lites 500 for eventual introduction into separate rotating elements 50 of stacking apparatuses 10 for subsequent stacking of lites 500, as more fully described below. Alignment conveyor 1800 may possess any suitable dimension and speed in accord with industry standards and desires. Alignment conveyor 1800 is preferably rotatable via conventional drive shafts, timing belts and motors as known within the art.

Referring now to FIG. 2, preferably, belt conveyor assembly 20 preferably possesses belts 20a, 20b, 20c, 20d, 20e and 20f preferably in rotatable communication with alignment conveyor 1800 via roller 21 and/or other conventional drive shafts, timing belts and motors as known within the art. Preferably in rotatable communication with belts 20a, 20b, 20c, 20d, 20e and 20f of belt conveyor assembly 20 is sub-belt conveyor assembly 30. Specifically, sub-belt 30a is preferably rotatably connected with belts 20a and 20b of belt conveyor assembly 20, sub-belt 30b is preferably rotatably connected with belts 20c and 20d of belt conveyor assembly 20, and sub-belt 30c is preferably rotatably connected with belts 20e and 20f of belt conveyor assembly 20.

Disposed preferably opposite the rotatable connection between sub-belt 30a and belts 20a and 20b is cam arm 102 of cam mechanism 100. Disposed preferably opposite the rotatable connection between sub-belt 30b and belts 20c and 20d is cam arm 104 of cam mechanism 100. Similarly, disposed preferably opposite the rotatable connection between sub-belt 30c and belts 20e and 20f is cam arm 106 of cam mechanism 100. Cam arms 102, 104 and 106 are preferably substantially downwardly arcuate members and preferably function to bring lites 500 from a substantially horizontal position from off sub-belt conveyor assembly 30 to a substantially vertical position into indexing slide 120 as lites 500 leave sub-belt conveyor assembly 30, as more fully described below. Belt conveyor assembly 20 and sub-belt conveyor assembly 30 preferably function to convey lites 500 to rotating element 50 for subsequent stacking thereof. Additionally, laser photo eyes (not shown) are preferably disposed proximal to belt conveyor assembly 20 for assisting in the automated halt of lites 500 on belt conveyor assembly 20, wherein the halting of lites of 500 preferably enables, if necessary, the realignment and/or removal of lites 500 therefrom.

Rotating element 50 is preferably wheel-like possessing preferably star-shaped support wheels 52, 54, 56 and 58 preferably rigidly joined to a common axle 60, wherein axle 60 is rotatable via conventional drive shafts, timing belts and motors as known within the art so as to preferably permit the simultaneous rotation of support wheels 52, 54, 56 and 58 thereabout. Support wheels 52, 54, 56 and 58 preferably each possess preferably five uniformly-sized and uniformly-spaced substantially triangular-shaped blades 62, wherein each blade 62 of each support wheel 52, 54, 56 and 58 preferably possesses frictional edge 64 and a lip 66 formed at the apex of each blade 62. Lips 66 are dimensioned to receive the edge of a lite 500. Frictional edge 64 of each blade 62 preferably serves to retain a conveyed lite 500 supported thereon during rotation of rotating element 50, wherein frictional edge 64 may possess any suitable frictional surface known within the art, such as, for exemplary purposes only, sponge foam or the like. Thus, as shown in FIG. 2, each of the blades 62 has an edge 64 along a length of which extends the frictional surface. Moreover, when each lite 500 is conveyed over belt conveyor assembly 20 and sub-belt conveyor assembly 30 toward rotating element 50, lip 66 of each blade 62 preferably receives the leading edge of the conveyed lite 500, wherein lip 66 preferably functions to cup or support the conveyed lite 500 thereon during rotation of rotating element 50 and maintain such support until lite 500 is received by indexing slide 120, as more fully described below. In an alternate embodiment, vacuum mechanisms (not shown) are positioned proximal to rotating element 50 and slide support assembly 100 preferably to give lites 500 added support against blades 62 of rotating element 50.

Preferably, support wheels 52 and 54 of rotating element 50 preferably flank belts 20a and 20b of belt conveyor assembly 20, rotatably connected sub-belt 30a of sub-belt conveyor assembly 30 and cam arm 102 of cam mechanism 100. Support wheels 54 and 56 of rotating element 50 preferably flank belts 20c and 20d of belt conveyor assembly 20, rotatably connected sub-belt 30b of sub-belt conveyor assembly 30 and cam arm 104 of cam mechanism 100. Similarly, support wheels 56 and 58 of rotating element 50 preferably flank belts 20e and 20f of belt conveyor assembly 20, rotatably connected sub-belt 30c of sub-belt conveyor assembly 30 and cam arm 106 of cam mechanism 100.

Figure 3B:
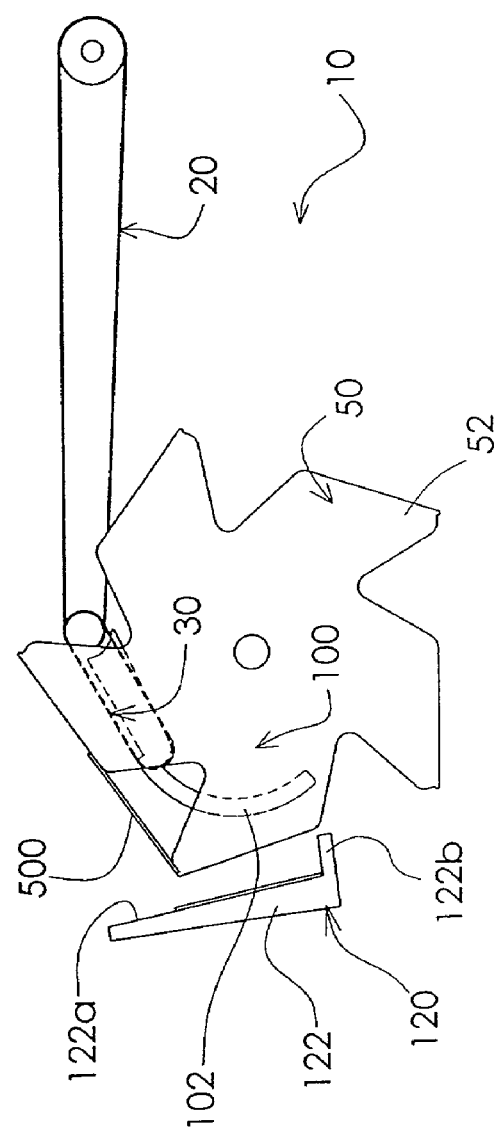
FIG. 3B is a perspective view of an apparatus for stacking small sheets of glass according to a preferred embodiment of the present invention showing a glass sheet/lite in the process of being stacked.
Figure 3C:
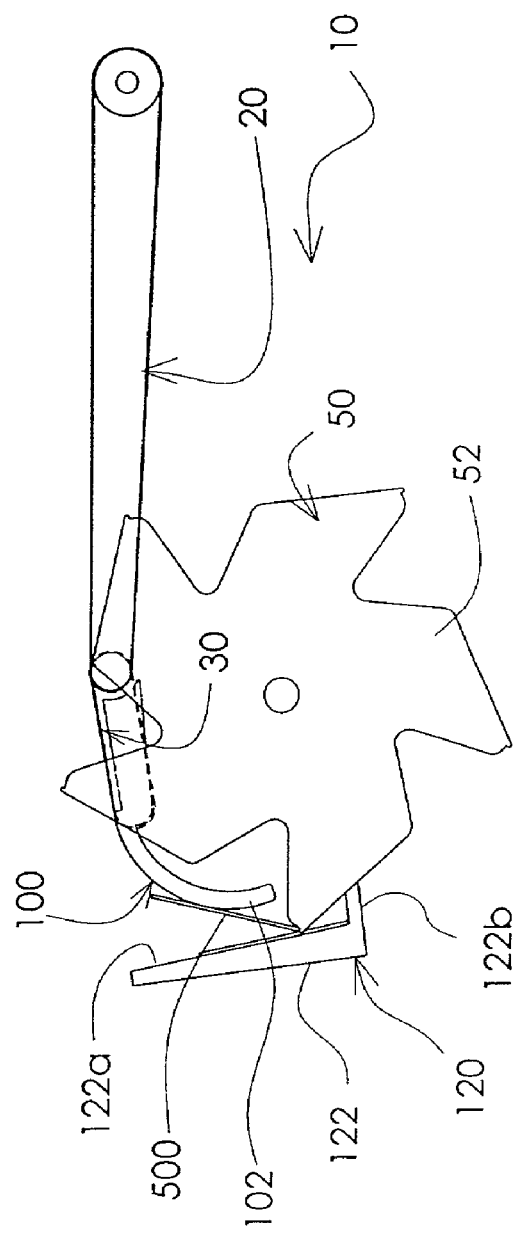
FIG. 3C is a perspective view of an apparatus for stacking small sheets of glass according to a preferred embodiment of the present invention showing a glass sheet/lite in the process of being stacked.

Referring specifically now to FIGS. 3A–3C, preferably, upon rotation of rotating element 50 and the pulling of lites 500 over blades 62 of rotating element 50 via frictional edges 64, lites 500 are preferably permitted to slide over sub-belt conveyor assembly 30 and cam mechanism 100, wherein sub-belt conveyor assembly 30 and communicating cam mechanism 100 preferably downwardly pivot to assist in the full clearance of lites 500 past/over cam arms 102, 104 and 106 of cam mechanism 100 and into seats 122b and 124b of indexing slide 120. To assist in pushing a lite 500 up against backrests 122a and 124a of indexing slide 120 and into a vertical position therein, cam arms 102, 104 and 106 and communicating sub-belt conveyor assembly 30 preferably pivot back upward and simultaneously gently push/kick the trailing edge of lite 500, thus pushing lite 500 into a substantially vertical position within indexing slide 120.

Referring now to FIG. 4, Indexing slide 120 is preferably positioned proximal slide support assembly 100 and preferably possesses generally L-shaped brackets 122 and 124, wherein bracket 122 preferably possesses backrest 122a and seat 122b, and wherein bracket 124 preferably possesses backrest 124a and seat 124b. Seats 122b and 124b of brackets 122 and 124, respectively, are preferably in communication with indexed rails 126 and 128, respectively, wherein indexed rails 126 and 128 preferably possess ball-shaped notches/grooves 126a and 128a, respectively. Ball-shaped notches 126a and 128a of rails 126 and 128, respectively, preferably enable spring-loaded ball-shaped screws 130 and 132 of seats 122b and 124b, respectively, of brackets 122 and 124, respectively to lockably engage and index therewith, such that upon receiving a lite 500, indexing slide 120 preferably indexes back, allowing ball-shaped screws 130 and 132 to engage the succeeding respective ball-shaped notch 126a and 128a, thus making room for subsequently deposited lites 500 therein. Specifically, as a lite 500 supportingly rotates against and on rotating element 50 and approaches indexing slide 120, seats 122b and 124b of brackets 122 and 124 preferably contact the leading edge of lite 500, supporting lite 500 thereon and against backrests 122a and 124a of brackets 122 and 124, respectively, when lites 500 are pushed thereagainst via cam mechanism 100. Preferably simultaneously, and due to rotation of rotating element 50, lips 66 of blades 62 of rotating element 50 leave/disengage the leading edge of lite 500. Subsequently, indexing slide 120 preferably indexes back to provide room for subsequently deposited lites 500. The entire stacking process is preferably computer-controlled and fully automated. It is contemplated in an alternate embodiment that indexing slide 120 could index via other suitable indexing mechanisms, such as, for exemplary purposes only, ridge-and-channel indexing mechanisms. It is further contemplated that indexing slide 120 could possess frames or containers of sorts wherein lites 500 would be deposited therein, and wherein the entire frame along with the deposited/stacked lites 500 could be removed by robotic arm 150.

Figure 5:
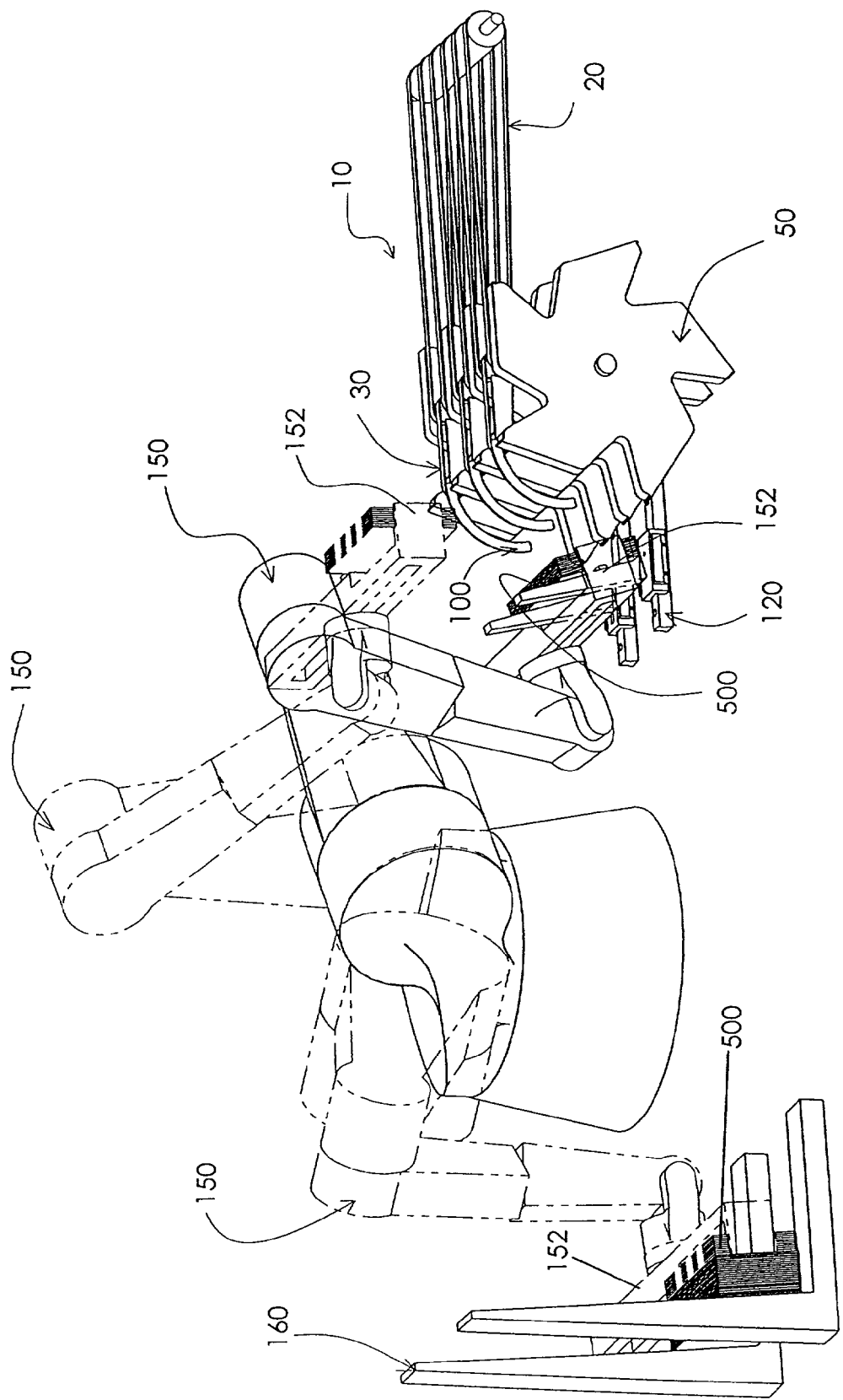
FIG. 5 is a perspective view of an apparatus for stacking small sheets of glass according to a preferred embodiment of the present invention showing a robotic arm handling a stack of lites.

Referring now to FIG. 5, after a desired quantity of lites 500 have been collected/stacked within indexing slide 120, robotic arm 150 preferably grasps the stacked lites 500 from indexing slide 120 via robotic hand 152. Robotic arm 120, via assistance from robotic hand 152, can preferably grasp lites 500 from any orientation, including, but not limited to, front, rear, side, top, bottom, portrait and/or landscape orientations. After grasping and picking up the stacked lites 500 from indexing slide 120, robotic arm 150 preferably stacks lites 500 on transportation unit 160, wherein robotic arm 150 can stack lites 500 in single and/or multiple rows and/or tiers. Transportation unit 160 is preferably any suitable transportation unit known within the art, such as, for exemplary purposes only, racks, shuttles and/or turntables. The entire stacking process is preferably computer-controlled and/or fully automated, and preferably operates in a cyclic and/or continuous manner, wherein the speed of the process is preferably regulated according to industry standard and desire.

Referring now to FIG. 6, according to an alternate embodiment of the present invention, apparatus 10 could possess rams 200 instead of cam mechanisms 100, wherein rams 200 are piston-like and extend forward to push lites 500 from off rotating element 50 and into indexing slide 120 when lite 500 is brought substantially parallel to backrests 122a and 124a of indexing slide 120 via rotating element 50, thus allowing lite 500 to be placed in a substantially vertical position therein.

It is contemplated in an alternate embodiment that multiple stacking apparatuses 10 could be utilized to better accommodate specific industry standards and/or desires.

It is contemplated in an alternate embodiment that apparatus 10 could be suspended from an upward location.

It is contemplated in an alternate embodiment that any number of robotic arms 150 and/or transportation units 160 could be utilized to regulate the overall stacking process.

It is contemplated in yet another alternate embodiment that rotating element 50 could be manufactured to a larger scale and incorporate a plurality of support wheels having a plurality of blades to permit high output lite 500 stacking.

It is contemplated in still another alternate embodiment that the present invention could be adapted, altered and/or modified to allow the stacking of any size, width, thickness and/or number of glass sheets/lites 500.

It is contemplated in still another alternate embodiment that the present invention could be adapted, altered and/or modified to allow the stacking of a variety of any size, width, thickness and/or number of glass sheets/lites 500.

It is contemplated in still another alternate embodiment that the present invention could be adapted, altered and/or modified to allow the stacking of any type of sheet of material, such as, for exemplary purposes only, wood sheets, plastic sheets and/or metal sheets.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. An apparatus for stacking sheets of glass, comprising: means for conveying the sheets of glass to be stacked: means for receiving the sheets of glass from said means for conveying and relaying the sheets of glass in an orderly fashion; and means for stacking the sheets of glass relayed from said means for receiving, wherein said means for receiving the sheets of glass from said means for conveying is at least one rotating wheel, wherein said at least one rotating wheel possesses means for supporting the sheets of glass thereon, and wherein said means for supporting the sheets on said at least one rotating wheel is a plurality of blades that extend from said at least one rotating wheel, wherein said means for stacking the sheets of glass relayed from said means for receiving is at least one indexing slide, said at least one indexing slide capable of receiving and retaining sheets of glass placed therein by said means for receiving, and wherein said at least one indexing slide is capable of indexing to provide room for a plurality of sheets of glass deposited therein by said means for receiving.

2. An apparatus for stacking sheets of glass, comprising: means for conveying the sheets of glass to be stacked; means for receiving the sheets of glass from said means for conveying and relaying the sheets of glass in an orderly fashion; and means for stacking the sheets of glass relayed from said means for receiving, wherein said means for receiving the sheets of glass from said means for conveying is at least one rotating wheel, wherein said at least one rotating wheel possesses means for supporting the sheets of glass thereon, and wherein said means for supporting the sheets on said at least one rotating wheel is a plurality of blades that extend from said at least one rotating wheel, the apparatus further comprising means for removing the sheets of glass from said means for stacking and placing the sheets of glass in a desired location, wherein said means for removing the sheets of glass from said means for stacking is at least one robotic arm, said at least one robotic arm capable of picking up and removing the sheets of glass stacked in said means for stacking.

3. An apparatus for stacking sheets of glass, comprising: means for conveying the sheets of glass to be stacked; means for receiving the sheets of glass from said means for conveying and relaying the sheets of glass in an orderly fashion; and means for stacking the sheets of glass relayed from said means for receiving, wherein said means for receiving the sheets of glass from said means for conveying is at least one rotating wheel, wherein said at least one rotating wheel possesses means for supporting the sheets of glass thereon, and wherein said means for supporting the sheets on said at least one rotating wheel is a plurality of blades that extend from said at least one rotating wheel, the apparatus further comprising means for removing the sheets of glass from said means for stacking and placing the sheets of glass in a desired location, wherein said means for removing the sheets of glass from said means for stacking is at least one robotic arm, said at least one robotic arm capable of picking up and removing the sheets of glass stacked in said means for stacking, wherein said at least one robotic arm is capable of picking up the sheets of glass stacked in said means for stacking in any orientation for subsequent placement on a transportation rack at said desired location.

4. An apparatus for stacking sheets of glass, comprising: means for conveying the sheets of glass to be stacked; means for receiving the sheets of glass from said means for conveying and relaying the sheets of glass in an orderly fashion; and means for stacking the sheets of glass relayed from said means for receiving, wherein said means for receiving the sheets of glass from said means for conveying is at least one rotating wheel, wherein said at least one rotating wheel possesses means for supporting the sheets of glass thereon, and wherein said means for supporting the sheets on said at least one rotating wheel is a plurality of blades that extend from said at least one rotating wheel, the apparatus further comprising at least one cam mechanism disposed between said means for receiving and said means for stacking, said at least one cam mechanism assisting in the relay of sheets of glass from said means for receiving to said means for stacking.

5. An apparatus for stacking sheets of material, comprising: at least one conveyor for conveying sheets of material to be stacked; at least one receiving assembly for receiving the sheets of material from said at least one conveyor and relaying the sheets of material in an orderly fashion; at least one stacking mechanism for stacking the sheets of material relayed from said at least one receiving assembly; at least one relaying support for supporting sheets of material being relayed from said at least one receiving assembly to said at least one stacking mechanism; and at least one removal assembly for removing the sheets of material from said at least one stacking mechanism and placing the sheets of material in a desired location, wherein said at least one receiving assembly is at least one rotating wheel positioned at the end of said at least one conveyor, wherein said at least one rotating wheel possesses means for supporting the sheets of material thereon, wherein said means for supporting the sheets on said at least one rotating wheel is a plurality of blades that extend from said at least one rotating wheel, each of said plurality of blades having at least one frictional edge for the frictional support of a sheet of material thereon during rotation of said at least one rotating wheel, and wherein each of said plurality of blades possesses at least one lip formed at an apex of each of said plurality of blades, said at least one lip capable of supporting a sheet of material thereon during rotation of said at least one rotating wheel.

6. The apparatus for stacking sheets of material of claim 5, wherein said at least one conveyor is at least one conveyor belt.

7. The apparatus for stacking sheets of material of claim 5, wherein said at least one conveyor is at least one set of rollers.

8. The apparatus for stacking sheets of material of claim 5, wherein said at least one stacking mechanism for stacking the sheets of material relayed from said at least one receiving assembly is at least one indexing slide, said at least one indexing slide capable of receiving and retaining sheets of material placed therein by said at least one receiving assembly, and wherein said at least one indexing slide is capable of indexing to provide room for a plurality of sheets of material deposited therein by said at least one receiving assembly.

9. The apparatus for stacking sheets of material of claim 5, wherein said at least one relaying support for supporting sheets of material being relayed from said at least one receiving assembly to said at least one stacking mechanism is at least one cam mechanism disposed between said at least one receiving assembly and said at least one stacking mechanism, said at least one cam mechanism assisting in the relay of sheets of material from said at least one receiving assembly to said at least one stacking mechanism.

10. The apparatus for stacking sheets of material of claim 5, wherein said at least one removal assembly for removing the sheets of material from said at least one stacking mechanism and placing the sheets of material in a desired location is at least one robotic arm, said at least one robotic arm capable of picking up and removing the sheets of material stacked in said at least one stacking mechanism and placing the stacked sheets of material in any orientation on a transportation rack.

11. The apparatus for stacking sheets of material of claim 10, wherein said at least one robotic arm is capable of picking up the sheets of material stacked in said at least one stacking mechanism in any orientation for subsequent placement on said transportation rack.

12. A method of stacking sheets of glass, comprising the steps of: a. obtaining an apparatus for stacking sheets of glass, said apparatus comprising: i. at least one conveyor for conveying sheets of glass to be stacked; ii. at least one receiving assembly for receiving the sheets of glass from said at least one conveyor and relaying the sheets of glass in an orderly fashion; iii. at least one stacking mechanism for stacking the sheets of glass relayed from said at least one receiving assembly; iv. at least one relaying support for supporting sheets of glass being relayed from said at least one receiving assembly to said at least one stacking mechanism; and v. at least one removal assembly for removing the sheets of glass from said at least one stacking mechanism and placing the sheets of glass in a desired location, wherein said receiving assembly for receiving the sheets of glass from said conveyor is at least one rotating wheel, wherein said at least one rotating wheel possesses means for supporting the sheets of glass thereon, and wherein said means for supporting the sheets on said at least one rotating wheel is a plurality of blades that extend from said at least one rotating wheel; and b. operating said apparatus to enable stacking of the sheets of glass.

13. The method of claim 12, further comprising the step of pre-programming and computer controlling said apparatus to function at a desired speed and in a user-specified manner.

14. An apparatus for stacking sheets of material, comprising: at least one conveyor for conveying sheets of material to be stacked; at least one rotating wheel positioned at the end of said at least one conveyor for receiving the sheets of material from said at least one conveyor and relaying the sheets of material in an orderly fashion, said at least one rotating wheel having a plurality of blades extending therefrom, each of said plurality of blades having at least one frictional edge for the frictional support of a sheet of material thereon during rotation of said at least one rotating wheel; at least one indexing slide for receiving and retaining sheets of material placed therein by said at least one rotating wheel, wherein said at least one indexing slide is capable of indexing to provide room for a plurality of sheets of material deposited therein by said at least one rotating wheel; and means for uprighting the sheets of material being relayed from said at least one rotating wheel to said at least one indexing slide.

15. The apparatus for stacking sheets of material of claim 14, wherein said means for uprighting the sheets of material being relayed from said at least one rotating wheel to said at least one indexing slide is at least one cam arm.

16. The apparatus for stacking sheets of material of claim 14, wherein said means for uprighting the sheets of material being relayed from said at least one rotating wheel to said at least one indexing slide is at least one ram mechanism.

17. An apparatus for stacking sheets of material, comprising: at least one conveyor for conveying sheets of material to be stacked; at least one rotating wheel positioned at the end of said at least one conveyor for receiving the sheets of material from said at least one conveyor and relaying the sheets of material in an orderly fashion, said at least one rotating wheel having a plurality of blades extending therefrom, each of said plurality of blades having at least one frictional edge for the frictional support of a sheet of material thereon during rotation of said at least one rotating wheel, and wherein each of said plurality of blades further possesses at least one lip formed at an apex of each of said plurality of blades, said at least one lip capable of supporting a sheet of material thereon during rotation of said at least one rotating wheel; at least one indexing slide for receiving and retaining sheets of material placed therein by said at least one rotating wheel, wherein said at least one indexing slide is capable of indexing to provide room for a plurality of sheets of material deposited therein by said at least one rotating wheel; at least one cam arm for uprighting the sheets of material being relayed from said at least one rotating wheel to said at least one indexing slide; and at least one robotic arm capable of picking up and removing the sheets of material stacked in said at least one indexing slide and placing the stacked sheets of material in any orientation on a transportation rack.

* * * * *